United States Patent [19]

Davidson

[11] Patent Number: 4,681,447
[45] Date of Patent: Jul. 21, 1987

[54] INTERFEROMETER APPARATUS AND METHOD FOR DETERMINING THE SPATIAL RELATIONSHIP OF TWO OR MORE OBJECTS

[75] Inventor: Robert J. Davidson, Boise, Id.

[73] Assignee: Hewlett Packard Company, Palo Alto, Calif.

[21] Appl. No.: 900,266

[22] Filed: Aug. 26, 1986

Related U.S. Application Data

[63] Continuation of Ser. No. 591,100, Mar. 16, 1984, abandoned.

[51] Int. Cl.$^4$ .......................... G01B 9/02; G01B 11/02
[52] U.S. Cl. ...................................... 356/351; 356/358
[58] Field of Search ............... 356/349, 351, 357, 358, 356/359, 363

[56] References Cited

U.S. PATENT DOCUMENTS

| | | | |
|---|---|---|---|
| 3,635,552 | 1/1972 | de Lang | 356/359 X |
| 3,767,307 | 10/1973 | Bowker | 356/349 |
| 4,188,122 | 2/1980 | Massie et al. | 356/351 X |
| 4,298,283 | 11/1981 | Marosch et al. | 356/349 X |
| 4,340,304 | 7/1982 | Massie | 356/351 |

OTHER PUBLICATIONS

"An Optical Technique for Analysis of the Behaviour of Flying Heads in Computer Disc Files", Andrews, Japan Journal Applied Physics, 14 (1975), pp. 373-377.
"Measuring the Flight Height of Magnetic Heads on Magnetic Disks", Marosch et al., IBM Technical Disclosure, p. 1322, 9-1972.

Primary Examiner—Davis L. Willis
Assistant Examiner—S. A. Turner
Attorney, Agent, or Firm—William J. Bethurum

[57] ABSTRACT

Interferometer apparatus for determining the spatial relationship of two or more observed points such as the height of a magnetic transducer head as it moves over the surface of a spinning recording disc. A monochromatic light beam having components of characteristic polarization and frequency is separated with one component being directed upon the two observation points one of which may be on the transducer head and other may be on the spinning disc. The other component is simultaneously directed upon a reference surface. The reflected beams are then combined to produce an optical beat frequency which is subsequently detected electronically and converted to a voltage representative of the phase shift between images of the two points and utilized to provide the display of the distance between the two points.

2 Claims, 3 Drawing Figures

INTERFEROMETER APPARATUS AND METHOD FOR DETERMINING THE SPATIAL RELATIONSHIP OF TWO OR MORE OBJECTS

This application is a continuation of application Ser. No. 591,100, filed Mar. 16, 1984, now abandoned.

BACKGROUND OF THE INVENTION

The present invention relates to interferometers for detecting and measuring extremely small dimensions or distances, especially of objects that are in relative motion. It is known, for example, that the magnetic transducer element or slider used in recording and reading magnetic information on a spinning disc must "fly" over the surface of the disc at a predetermined height which is extremely small (i.e., 0.4 microns) without rolling or pitching. The interferometer of the present invention enables this height to be measured while the disc is in motion and to determine if, in fact, the slider is pitching or rolling with respect to the disc.

Heterodyne interferometers are well-known and understood, especially in applications where it is desired to determine the shape (i.e., flatness) of a surface such as of a mirror, for example. The basic principle is to produce a monochromatic light beam and to split the beam into two components, each of a different polarization and frequency. One component is directed to and ultimately reflected from the surface being examined; the other interacts similarly with a reference surface. By bringing the reflected beams together, an interference pattern characteristic of the test surface is produced. It will be understood that the variation from point to point of the interference pattern results from the differences of deviations between the two reflecting surfaces. This interference pattern is detected as an optical beat frequency, the phase of which varies in proportion to the variation in optical path length between the test and reference areas of the interferometer. It is customary to convert light from a point in the optical image of the interference pattern into electrical signals and to store these signals for comparison with signals subsequently derived by repeating the process for additional points on the test surface, each such point providing a characteristic phase of the optical beat frequency which will be different for each point if there are deviations in the test surface at each point. The phase difference between points on the test surface being a measure of the extent of the deviations between the various points and thus indicative of the shape (topography) of the surface.

Typical of the interferometers of the prior art are U.S. Pat. Nos. 4,188,122 and 4,340,304 to N.A. Massie et al, and N.A. Massie, respectively. In both patents, the ultimately obtained light beams or images from the reflecting surfaces are combined and collapsed into a single plane of polarization so that they optically interfere and produce an interference pattern which is scanned in a single plane to produce electrical signals representative of the deviations of the test surface relative to the reference surface.

In the interferometer systems of the prior art the topography of the surface under examination is determined by examining each point sequentially. This is permissible since the surface under survey is substantially fixed or immobile or, if in motion or undergoing a change, the rate of change is so slow that for all pratical purposes there is no noticeable change in the surface due to motion or change thereof during the time elapsing between observations. Such a sequential observation technique is acceptable under the "static" circumstances just defined. In a dynamic situation where the surface under examination may be in a state of rapid change, defined as being a rate of change between observation points faster than the elapsed time between observations, the observations from point to point cannot be made sequentially but must be performed substantially simultaneously. This is the situation where it is desired to determine the flying height of a magnetic transducer head as it flies over the surface of the rapidly spinning recording disc. Variations in this flying height occur so rapidly that a point on the head must be observed substantially simultaneously with the observation of a point of the recording disc. The present invention provides means and ways to accomplish such observations with interferometer apparatus.

SUMMARY OF THE INVENTION

According to the present invention, an interferometer system is provided which initially produces two monochromatic light beams orthogonally polarized with respect to each other. Each beam is then shifted in frequency so that each has a frequency different from the other. A beam of one polarization and frequency is directed onto an area of a spinning recording disc where a transducer head is positioned. Simultaneously the beam of the other polarization and frequency is directed onto a reference surface. Upon reflection from the respective surface the two beams are next passed through a system of polarizers and which allow the beams to interact to produce an optical beat frequency. Two images containing the same beat frequency phase information are then formed on discrete planes where optical fiber elements are positioned. Each optical fiber, one positioned to intercept light from the disc and one to intercept light from the transducer head, thereupon transmits its respectively received light image to a detector system where the light images are respectively converted into electrical signals and the optical beat frequency is detected electronically. A difference in surface profile of the spinning disc and the transducer head, such as due to the vertical displacement of the transducer head over the surface of the disc, will be detected as a phase shift of the optical beat frequency. A voltage out of the phase detector electronics can then be interpreted as a measure of the height of the transducer head over the disc. By making observations at different points on the transducer head one can also determine whether the head is in a pitch or roll attitude.

DETAILED DESCRIPTION OF THE INVENTION

Figure 1:
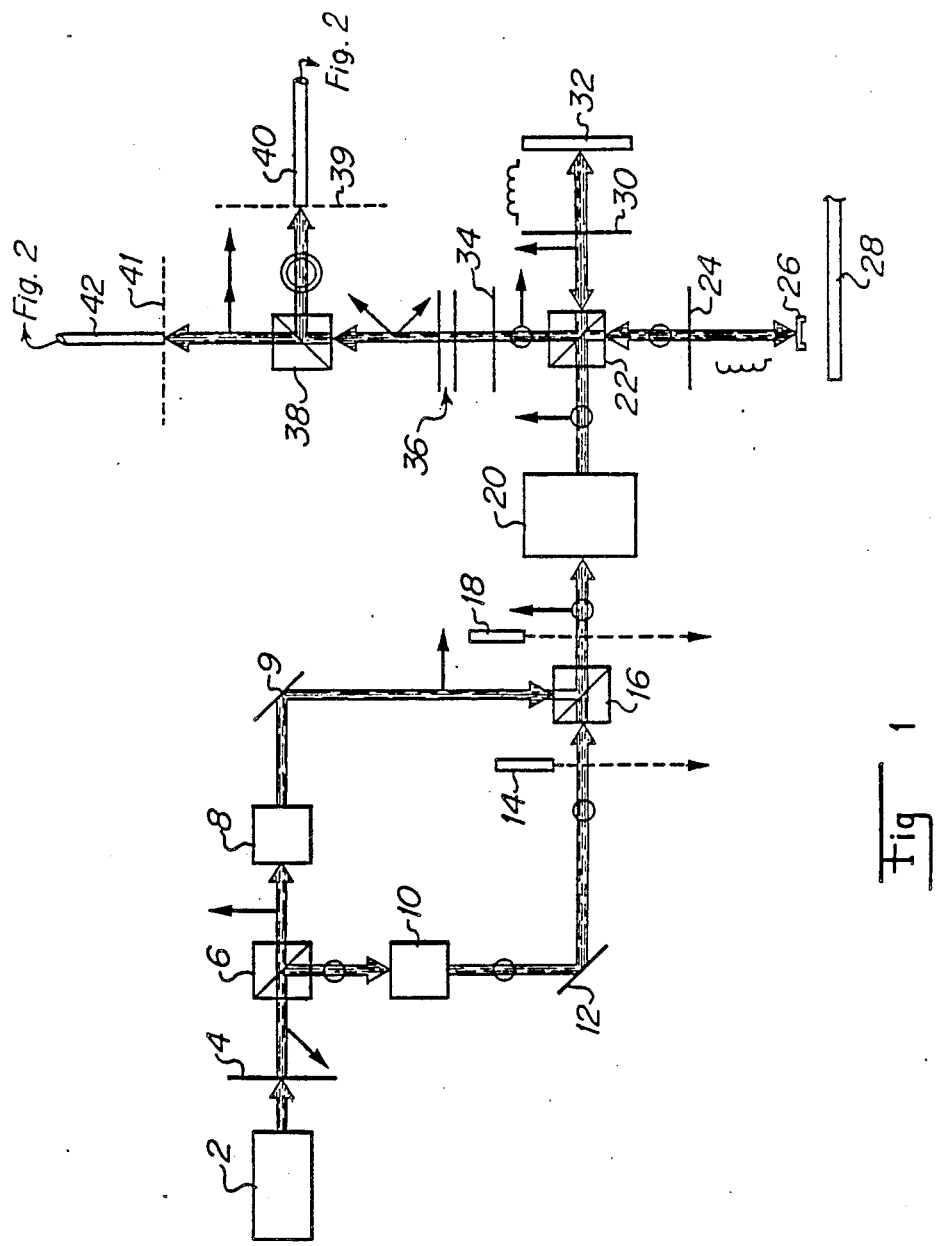
FIG. 1 is a block diagram of a preferred embodiment of the invention.

Referring now to FIG. 1 the heterodyne interferometer of the invention includes means for producing a composite beam having two components which differ in frequency and polarization. To this end, a He-Ne laser 2 is provided for generating a well collimated, highly monochromatic light beam of a single wavelength of 632.8 nm. This light beam is first directed to and through a rotatable half-wave plate 4 which permits the intensity of two segments of the light beam, subsequently formed, to be balanced. The initial output beam of the laser is linearly polarized in an arbitrary plane. In the drawings, the following symbols are used to designate the various polarization planes of the light beam(s), it being understood that the reference plane for these symbols is the plane of the paper on which the drawings appear. A solid arrow indicates the angular direction of the polarization of the light beam with respect to the axis of the light beam when this plane is coincident with the plane of the paper. A circle on the light beam indicates that the polarization plane of the light beam is perpendicular to the plane of the paper. Thus, as shown, the plane of polarization of the light beam as it emerges from the half-wave plate 4 is at an angle of 45 degrees with respect to the plane of incidence of polarization beam splitter. The half-wave plate 4 permits adjustment of the initial plane of polarization of the laser.

The next step is to separate or split the beam into two segments so that each segment can be uniquely acted upon to import to each a distinct polarization and a distinct frequency. Thus, the beam is passed through a polarization beam splitter 6 which splits the beam into two segments shown emerging from the beam splitter in two different directions. Each segment is still of the same frequency but the polarization of each has been changed from the initial polarization of the unseparated beam. Thus, one beam now has a plane of polarization indicated as perpendicular to the plane of the drawings while the other has a plane of polarization shown as still parallel to the plane of the drawings but perpendicular to the beam's axis of propagation.

Each segment is then shifted frequency by respective acoustic—optic modulators 8 and 10. Such optical frequency shifters are well known in the art and their structure and operation will not be described in detail herein. The perpendicularly polarized beam may emerge from the optical frequency shifter 10 with a frequency of $4.75 \times 10^{14}$Hz+f1 (thus, for example, f1 may be 40 MHz) while the other beam may emerge from the optical frequency shifter 8 with a frequency of $4.75 \times 10^{14}$Hz+f2 (thus, for example, f2 may be 42 MHz).

The next step is to recombine the two beams and form a composite beam having the aforementioned two components each being of a different polarization and frequency. To bring the two beam segments to the beam combiner 16 it may be necessary, as shown in the drawings, to bend or turn the respective propagation paths of the two segments 90 degrees by means of appropriately positioned bending mirrors 9 and 12. The beam combiner 16 is substantially identical to the beam splitter 6. Because of the specific orientation of the beam combiner one beam segment is reflected by 90 degrees while the other segment passes through the combiner so that a combination beam emerges therefrom. The combination beam is now comprised of two components each different frequency and each distinctly identified by their respective polarizations as well. Because of their orthogonally oriented polarizations, the two beam components do not interfere with each other.

Disposed on one of the input sides of the beam combiner 16 is a movable shield 14 which permits interrupting one of the input beams while letting the other pass through the combiner. On the output side of the combiner is a movable half-wave plate 18. As a part of the set-up procedure, one of the input beams is blocked by moving the shield 14 into position so to do. Likewise, the half-wave plate 18 is moved into position as to permit the rotation of the plane of polarization (of the beam) to the 45 degree orientiation. With one of the beams now blocked, the remainder of the system shown operates as a conventional interferometer to permit adjustment of the position of the reference plane (32) so as to be parallel to the surface of the transducer head or slider (26) and disc (28) both to be described more fully hereinafter.

Since the combined beam emerging from the beam combiner 16 is of relatively small diameter (i.e., 0.8 millimeter), it needs to be enlarged somewhat in cross-section so as to be able to sufficiently encompass or cover the observation points or areas on the objects being examined. It is, therefore, passed through the beam expander 20 where it may be widened to about 15 millimeters in diameter. After expansion the combined beam is ready to be utilized to observe the object or objects under examination. The beam is therefor directed into a polarization beam splitter 22 which separates the two beam components according to their respective polarizations. Thus, one (hereinafter called the "reference beam") emerges from the splitter 22 and is directed to fall upon a reference plane 32 which, may be a highly reflective mirror surface, and the other beam (the "test beam") is directed to fall upon the object(s) 26 and 28 under observation. The object 26 may be a magnetic transducer head or slider which is elevated above the surface of the object 28 which may be a rapidly spinning recording disc. The slider element is so designed that it is caused to rise and "fly" on the film of air clinging to the surface of the recording disc and moving with the disc surface as the disc spins. Since the efficiency of the recording or reading of magnetic information on the disc depends to a large extent on the flying height of the slider element over the disc, it is desirable to determine precisely the flying height and whether the slider element is in a pitch and/or roll attitude. As will be described more fully hereinafter the difference in the two fringe patterns thus obtained may be used to calculate the spatial distance between the observed point on the transducer head and the observed point on the recording disc.

Interposed between the beam splitter 22 and the test objects 26, 28 and the reference plane 32 are a pair of quarter-wave plates 24 and 30, respectively. The purpose of these plates is to produce helical polarization, which after reflection from the respective surfaces, has its helicity inverted and upon passing through the quarter-wave plate on return converts the orignial linear polarization into linear polarization perpendicular to the original beam. The reflected beams travel back through the beam splitter 22 which now acts as a beam combiner and causes the combined beam to emerge from the beam combiner 22 in a direction substantially at a right angle with respect to the initial direction of entry of the combined beam into the beam splitter 22. This may be explained when it is understood that the helical polarization imparted to the two beams results in shifting the plane of polarization of each beam by 90 degrees with respect to the polarization plane of the beams prior to passing through the quarter-wave plates 24 and 30. Without this 90 degree shift in the plane of polarization the two reflected beams would emerge from the beam splitter 22 along the same path at which they entered.

After the combined reflected beams emerge from the beam splitter-combiner 22 they are passed through a half wave plate 34 which rotates both components by 45 degrees so that when they pass through the polarization beam splitter (38), they will be able to interfere to produce the optical beat pattern described above. However, in order to permit imaging of the reflections from the test and reference objects, a lens system 36 is provided in the path of the combined reflected beams.

The combined reflected beams are next passed through a beam splitter 38 which separates the combined beam into two parts which form identical images at image planes 39 and 41. Optical fibers 40 and 42 are positioned so that the fiber 40 picks up light from the interference pattern characteristic of the head (26) and the fiber 42 picks up light from the interference pattern characteristic of the adjacent disk. For convenience in the following description, the fiber optic strand 42 and its subsequently associated eletronics will be referred to as constituting a first channel denoted "Channel 1" while the other fiber optic strand 40 and its subsequently associated electronics will be referred to as "Channel 2".

Figure 2:
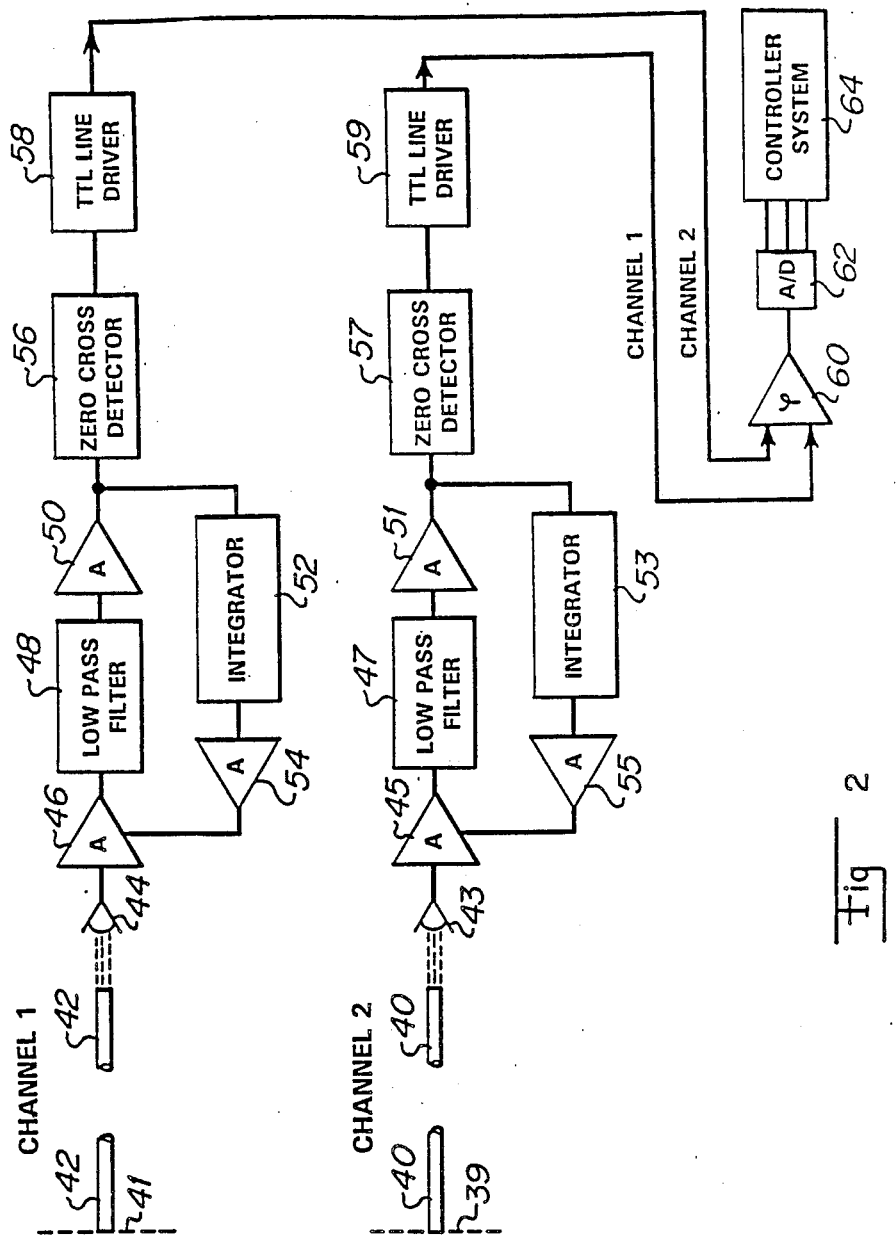
FIG. 2 is a block diagram of the phase detector circuitry for use with the interferometer of the invention.

Referring now to FIG. 2, a phase detection and comparison system is shown whose purpose is to electronically detect the optical beat frequency of the interference patterns characteristic of the beams reflected from the test objects (the transducer head or slider and the recording disc). The phase detector/amplifier system will translate the beat frequency of the interference pattern derived from the transducer head and the reference plane to a voltage representative of the optical beating between the two images. Similarly a second voltage will be developed by the second channel representative of the optical beating between the images from the recording disc and the reference plane. These voltages may then be compared in the phase detector circuit and the output of the phase detector read as the relative displacement between the transducer head and the recording disc. These phase differences are derived in parallel by processing the optical images from the test objects in Channel 1 while simultaneously processing the corresponding optical images in Channel 2, for example.

Figure 3:
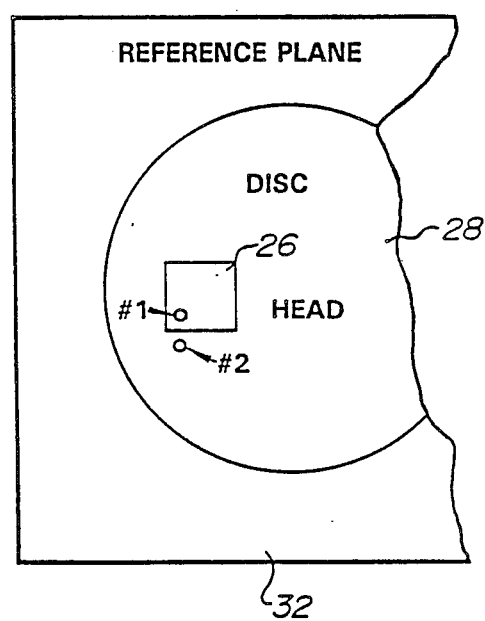
FIG. 3 is a partial plan view showing the disposition and relationship of the reference plane, the magnetic recording disc and the transducer head during observation and measurement with the interferometer of the invention.

The optical signals in each of the fiber optic strands 40, 42 are first converted into electrical signals by permitting the light from each strand to fall upon respective avalanche photo-diode detectors 43 and 44 in Channels 1 and 2. Since the two electronic channels are identical in function and operation, only (Channel 1) will be described in detail herein. The primary purpose of the two electronic channels when combined with the phase detector is to provide output voltages proportional to the phase difference therebetween which, in turn, is representative of the interference fringe pattern derived by the interferometer. The electrical signals derived from the photo-detector 44 are first amplified by an amplifier 46 and then filtered by a low pass filter 48 to reduce the frequency response of the channel to the minimum required by the channel for proper operation. Typically, for example, the low pass filter will block all frequencies except those below 5 MHz. This thus reduces the bandwidth of the channel and improves the signal-to-noise level of the system. The output of the low pass filter 48 is then further amplified by a fixed gain amplifier 50 to supply the additional gain required by the automatic gain control circuit (not separately shown) which is a part of the initial amplifier 46. A rectified sample of the output signal from the fixed gain amplifier 50 is then integrated by the integrator 52 to yield a DC signal proportional to the amplitude of the signal received from the amplifier 50. This DC signal is applied to the amplifier 54 which adjusts the level of the output of the integrator 52 to the value necessary to set or adjust the gain of the amplifier 46. The sinusoidal output of the amplifier 50 is then converted into a square wave signal by the zero cross detector 56 to permit the output of this amplifier to be processed by the succeeding digital phase detector circuitry. The state of the squae wave outputs changes where the output of the amplifier 50 crosses zero. The square wave signal output of the zero-cross detector 56 is then fed to a TTL line driver 58 which drives the signal bus that carries signals between the photo detector 44 and a phase detector 60. The phase detector 60 which receives the outputs of both Channels 1 and 2 compares the relative phase of the signals from each channel and converts these signals into analog voltage proportional to the phase difference. Thus, this analog voltage will represent the relative displacement between the observed point (#1) on the transducer head 26 and the observed point #2 on the disk (FIG. 3). The analog voltages representing this phase difference are then converted into digital signals (i.e., "number") for processing by the computer or controller system 64. The controller or computer system 64 is programmed to provide an output in display and/or printed form directly indicative of the stontuneous displacement of the transducer head above the recording disc.

There thus has been shown and described a novel interferometer arrangement which permits the simultaneous examination of more than on point on a surface or surfaces which is especially useful where a surface may be in a state of rapid change such that spatial observations from point to point cannot be made sequentially.

What is claimed is:

1. Interferometer apparatus for simultaneously deriving optical properties respectively representative of the spatial relationship betweeen two observed moving objects having a time varying spatial relationship and determining the spatial relationship of the observed moving objects with respect to each other, comprising;
    (1) means for producing a beam of radiation having two components each having a characteristic frequency and polarization;
    (2) means for directing one component of said beam upon said two moving objects whose spatial relationship is to be determined and for directing the other component of said beam upon a reference surface to derive individual optical reflections of said two moving objects and an optical reflection from said reference surface;
    (3) means for interacting said individual optical reflections of said two moving objects with the optical reflection from said reference surface and forming two separate identical optical images having the same beat frequencies;
    (4) means for directing at least a portion of one of said identical optical images containing an image of one of said objects into a first optical path and for directing at least a portion of the other of said identical optical images containing an image of the other of said objects into a second optical path;

(5) means for converting a phase shift between the beat frequencies of said optical images in said first optical path and said second optical path into electrical signals;

(6) means for electrically combining said electrical signals to derive a voltage representative or the phase difference between the beat frequencies of said optical images; and (7) means utilizing said voltage to provide an indication of the spatial relationship between said two movable objects.

2. In an optical interferometer, the method for determining the time varying spatial relationship between two observed moving objects using a reference object, comprising:

(1) providing test and reference light beams of different polarization and frequency;

(2) reflecting said test light beam from said two observed moving objects;

(3) reflecting said reference light beam from said reference object;

(4) forming a combined reflected light beam by combining the reflected test light beam having a component part from each of said two observed moving objects, with the reflected reference light beam;

(5) simultaneously splitting the combined reflected light beam into two images of the same beat frequency and providing mixing of component parts to produce individual optical interference patterns representative, respectively, of said two observed moving objects and having a beat frequency phase relationship indicative of their spatial relationship; and (6) utilizing said beat frequency phase relationship of said interference patterns to determine the spatial relationship between said two moving objects.

* * * * *